2,726,124

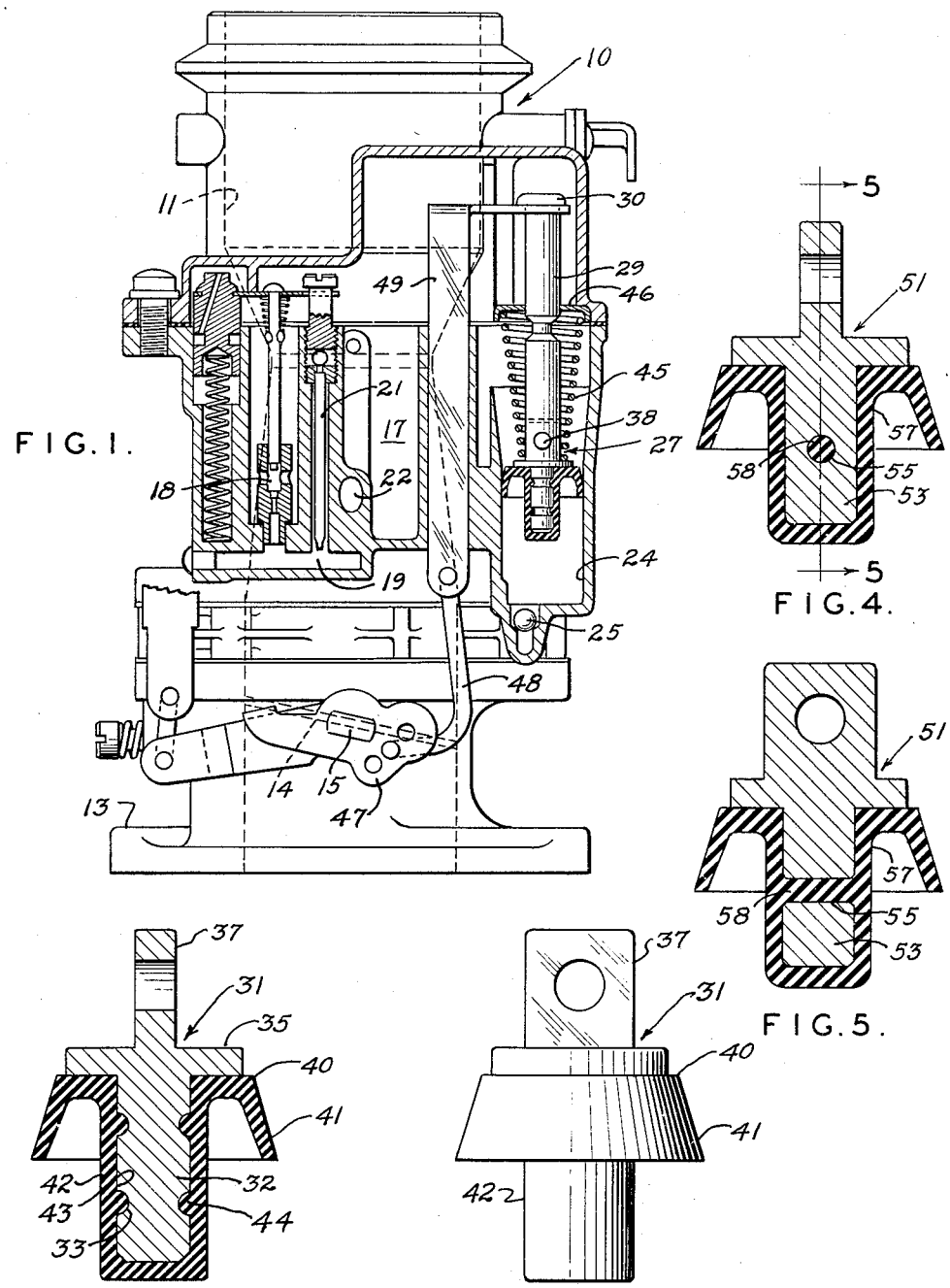
Dec. 6, 1955 — L. D. BOYCE — 2,726,124
PUMP PISTON
Filed April 7, 1952
INVENTOR.
LEONARD D. BOYCE
BY George R. Ericson
ATTORNEY United States Patent Office 2,726,124
Patented Dec. 6, 1955

PUMP PISTON

Leonard D. Boyce, Kirkwood, Mo., assignor to Carter Carburetor Corporation, St. Louis, Mo., a corporation of Delaware Application April 7, 1952, Serial No. 280,999

6 Claims. (Cl. 309—23)

This invention relates to reciprocating piston pumps and consists particularly in novel piston and piston packing means for pumps of this type.

The invention relates particularly to reciprocating piston pumps of relatively small size of the type frequently embodied in carburetors to supply accelerating fuel. In such pumps the piston structure generally includes a piston body, an operating rod, and a packing element for sealing engagement with the pump cylinder. In conventional pumps of this type the packing element frequently consists of a leather annulus, often expanded for sealing engagement with the cylinder wall by a spring of some type. Such packing elements are not uniform, are subject to relatively rapid deterioration in use, and because they lack resiliency, require some additional expanding means as has been pointed out above. To eliminate the obvious disadvantages of leather packing elements the use of a cup-shaped rubber element having a frustro-conical peripheral flange portion has been suggested. Rubber packings of this type can be cheaply produced in large quantities with a high degree of uniformity, and the inherent resilience of the rubber normally expands the frustro-conical flanges into a sealing engagement with the cylinder wall, thus obviating the necessity of a spring or other expander. The principal problem presented by rubber packing elements of this type has resided in the difficulty of sealingly mounting such elements on the piston itself. It has been found that if a cup-shaped element of this type having a central mounting aperture is compressed between a backing element and a clamping element, considerable distortion will occur in the rubber, with the possibility of leaks resulting between the flange portions and the cylinder wall.

It is an object of this invention to provide a novel piston and piston packing including self-contained mounting means.

It is a further object to provide a piston packing which may be molded on the piston body or which may be molded separately and readily slipped on the piston body.

An additional object is to provide a readily replaceable piston packing element incorporating means for securing itself to the piston body.

I achieve these and additional objects and advantages by forming the piston body with an axially extending portion and by forming the resilient packing element with a hollow axially extending portion adapted to matingly engage the axially extending portion of the piston body. For retaining the packing element against axial movement with respect to the body, I provide the mating surface of the body and packing element with matingly engageable transversely extending portions, such as registering lands and grooves.

Fig. 1 is a view of a carburetor partially sectionalized showing an accelerating pump incorporating the invention.

Fig. 2 is a vertical sectional view of the piston and packing element.

Fig. 3 is an enlarged elevational view of the piston and packing assembly.

Fig. 4 is a vertical sectional view, similar to Fig. 2, of a modified piston and packing element.

Fig. 5 is a vertical sectional view of the modification shown in Fig. 4, taken along the line 5—5 of Fig. 4.

Referring to the drawing the numeral 10 generally indicates an automotive carburetor having a mixture conduit 11 flanged at its lower end 13 for attachment to the intake manifold of an internal combustion engine. The outlet of mixture conduit 11 is controlled by a throttle valve 14 mounted on a shaft 15 which is rotatably journalled in the wall of mixture conduit 11. Fuel for operation of the carburetor is provided from a constant level fuel chamber 17 through a system of orifices and passageways including step-up valve 18, passage 19, idle orifice tube 21, and main fuel nozzle 22. Fuel for acceleration is provided by an accelerating pump including a cylinder 24, an inlet valve 25 providing communication between cylinder 24 and fuel reservoir 17, a discharge valve communicating with the pump jet in the mixture conduit, and a piston assembly, generally indicated at 27, mounted for axial movement in cylinder 24.

Piston assembly 27 includes a cylindrical operating rod 29 formed with a shoulder 30 at its upper end and with a diametral, axially extending slot at its lower end. The piston consists of a piston body and a packing element removably secured thereto. Piston body 31 consisting of a central stem portion 32 formed with a plurality of annular grooves 33 and having an annular shoulder portion 35, is provided with an axially extending tab 37, which is adapted for registry with the slot in the lower end of piston rod 29. The piston is removably secured to piston rod 29 by a pin 38 which passes through registering holes in the piston rod and tab 37. The packing element 40 is a cup-shaped member, the peripheral shoulder 41 of which forms the frustrum of a cone. The element 40 is formed with a central axially extending hollow stem portion 42, the central cylindrical cavity 43 of which is substantially of the same diameter and length as the piston stem portion 32 so as to permit mating engagement therewith. The wall of cavity 43 is provided with a plurality of annular lands 44 adapted for registry with grooves 33 of the piston stem portion when the packing is seated against shoulder 35, the cooperating lands and grooves serving to prevent axial movement between the body and packing, thereby, effectively, securing the packing to the body.

The packing element 40 may be molded on the piston, or it may be separately molded and slipped on, the resilience of the synthetic rubber permitting easy application or removal, and a secure attachment to the piston. If desired, the packing element may be bonded to the piston, although, for use in a pump of the type shown in Fig. 1, vulcanization of the packing to the piston is not necessary.

The piston operating means in the pump of Fig. 1 includes a coil spring 45 seated at its lower end on the upper surface of piston flange 35 and at its upper end in cup-shaped seat member 46. Spring 45 normally urges the piston downwardly. For accomplishing the intake stroke an operative connection is provided between the piston rod and the throttle shaft. This consists of arm 47 rigidly secured to an end of the throttle shaft, a link 48 pivotally connected at one end to arm 47 and at the other end to sliding member 49 which bears against shoulder 30 of piston rod 29 so that as the throttle valve is moved towards closed position member 49 urges piston rod 29 upwardly against the downward force of spring 45. During operation of the pump the inherent resilience of the synthetic rubber constantly urges the peripheral flange of the packing element 40 into sealing engagement with the wall of cylinder 24.

A modified piston body and packing is shown in Figs. 4 and 5. The piston body 51 is identical to piston body 31, heretofore described, with the exception that the stem portion 53 is formed without annular grooves in its surface. Instead of annular grooves, stem 53 is formed with one or more diametrally extending holes 55, so that when modified packing element 57 is molded on body 51, a portion of the synthetic rubber flows through holes 55, thereby forming a transverse rubber cylinder 58 integral with the packing element stem portion. Modified packing element 57, unlike the packing elements illustrated in Figs. 1 and 2, does not have any lands in its axial cavity, cylinder 58 and holes 55 cooperating to retain the packing on the piston body.

The invention may be modified as will occur to those skilled in the art, and exclusive use is contemplated of all modifications as come within the scope of the appended claims.

I claim:

1. In a fluid pump, a cylinder, a piston assembly mounted for axial movement therein, said piston assembly including an operating rod, a piston body provided with substantial clearance within said cylinder and secured to said operating rod, and a packing element, said body having an axially extending stem portion, said packing element being cup-shaped with a tapered, flared rim and a base extending beyond said piston body but provided with clearance within said cylinder, having a hollow axially extending portion adapted for mating engagement with said stem portion, said stem portion and said hollow portion being formed with cooperating substantially transversely extending portions for preventing axial movement of said packing element with respect to said body.

2. In a fluid pump, a cylinder, a piston assembly mounted for axial movement therein, said piston assembly including an operating rod, a piston body including a shoulder portion provided with substantial clearance within said cylinder and secured to said operating rod, and a packing element, said body having an axially extending stem portion, said packing element being cup-shaped with a tapered, flared rim and a base extending beyond said shoulder, but provided with clearance within said cylinder and having an axially extending hollow portion adapted for mating engagement with said stem portion, said stem portion and said hollow portion being formed with registering lands and grooves for preventing axial movement between said body and said packing element.

3. In a fluid pump, a cylinder, a piston assembly mounted for axial movement therein, said piston assembly including an operating rod, a piston body secured to said operating rod, and a packing element, said body including a shoulder portion provided with substantial clearance within said cylinder, and an axially extending stem portion, said packing element being cup-shaped with a tapered, flared rim and a base extending beyond said shoulder portion, but provided with clearance within said cylinder and having an axially extending hollow portion adapted for mating engagement with said stem portion, said stem portion and said hollow portion being formed with lands and grooves adaptable for registry with each other when said packing element is in abutting engagement with said shoulder portion whereby to prevent axial movement between said body and said packing element.

4. In a fluid pump, a cylinder, a piston assembly mounted for axial movement therein, said piston assembly including an operating rod, a piston body secured to said operating rod, and a packing element, said body provided with substantial clearance within said cylinder, and having an axially extending stem portion, said packing element being cup-shaped with a tapered, flared rim and a base extending beyond said body but provided with clearance within said cylinder and having an axially extending hollow portion adapted for mating engagement with said stem portion, said stem portion and said hollow portion being formed with a substantially transverse opening and a substantially transversely extending portion passing through said opening for preventing axial movement between said body and said packing element.

5. In a fluid pump, a cylinder, a piston assembly mounted for axial movement therein, said piston assembly including an operating rod, a piston body secured to said operating rod, and a packing element, said body including a shoulder portion provided with substantial clearance within said cylinder, and an axially extending stem portion, said packing element being cup-shaped with a tapered, flared rim and a base extending beyond said shoulder portion, but provided with clearance within said cylinder and having an axially extending hollow portion in said base adapted for mating engagement with said stem portion, said stem portion and said hollow portion being formed, respectively, with a substantially transverse opening and with a substantially transversely extending portion passing through said opening when said packing element is in abutting engagement with said shoulder portion whereby to prevent axial movement between said body and said packing element.

6. In a fluid pump having a cylinder, a piston assembly in said cylinder, and an operating means for reciprocating said piston in said cylinder, the combination in said piston assembly comprising a piston body provided with substantial clearance within said cylinder, a connection for said operating means on said piston body, an axially extending, centrally located stem on said piston body opposite said connection, a cup-shaped packing element on said piston including a circular base with its outer edge spaced from said cylinder and extending beyond the outside of said piston body, an upstanding, tapered, flared rim on said base extending into sealing contact with said cylinder, and a hollow, axially extending portion on said base adapted for mating engagement with said stem, said portion and said stem being formed with cooperating interengaging parts for preventing axial movement of said packing with respect to said stem.

References Cited in the file of this patent

UNITED STATES PATENTS

| Number | Name | Date |
|---|---|---|
| 1,718,474 | McQuaid | June 25, 1929 |
| 2,055,104 | Hewitt | Sept. 22, 1936 |
| 2,155,207 | Stocker | Apr. 18, 1939 |
| 2,156,120 | La Brie | Apr. 25, 1939 |
| 2,196,337 | Loweke | Apr. 9, 1940 |
| 2,309,446 | Ekkebus | Jan. 26, 1943 |
| 2,428,452 | Farmer | Oct. 7, 1947 |
| 2,571,486 | Reynolds | Oct. 16, 1951 |